US011466219B2

(12) United States Patent
Paasikallio et al.

(10) Patent No.: US 11,466,219 B2
(45) Date of Patent: Oct. 11, 2022

(54) PROCESS FOR INCREASING GASOLINE AND MIDDLE DISTILLATE SELECTIVITY IN CATALYTIC CRACKING

(71) Applicant: Neste Oyj, Espoo (FI)

(72) Inventors: Ville Paasikallio, Porvoo (FI); Blanka Toukoniitty, Porvoo (FI); Jukka-Pekka Pasanen, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 16/627,689

(22) PCT Filed: Jun. 26, 2018

(86) PCT No.: PCT/FI2018/050501
§ 371 (c)(1),
(2) Date: Dec. 30, 2019

(87) PCT Pub. No.: WO2019/002683
PCT Pub. Date: Jan. 3, 2019

(65) Prior Publication Data
US 2020/0165529 A1 May 28, 2020

(30) Foreign Application Priority Data
Jun. 29, 2017 (EP) ..................... 17178808

(51) Int. Cl.
*C10G 3/00* (2006.01)
*C10G 11/02* (2006.01)
(Continued)

(52) U.S. Cl.
CPC ............. *C10G 3/42* (2013.01); *C10G 1/002* (2013.01); *C10G 3/00* (2013.01); *C10G 11/02* (2013.01);
(Continued)

(58) Field of Classification Search
CPC ....................................... C10G 3/42
See application file for complete search history.

(56) References Cited

U.S. PATENT DOCUMENTS 4,876,108 A 10/1989 Underwood et al.
5,395,455 A 3/1995 Scott et al.
(Continued)

FOREIGN PATENT DOCUMENTS

CA 2951614 A1 2/2017
CN 103201357 A 7/2013
(Continued)

OTHER PUBLICATIONS

B. Holmbom et al. "Composition of Tall Oil Pitch" Journal of the American Oil Chemists' Society. vol. 55, Issue 3, pp. 342-344. 1978. (Year: 1978).*
(Continued)

*Primary Examiner* — Philip Y Louie
*Assistant Examiner* — Alyssa L Cepluch
(74) *Attorney, Agent, or Firm* — Buchanan Ingersoll & Rooney PC (57) ABSTRACT

A process is disclosed for increasing gasoline and middle distillate selectivity in catalytic cracking. A process can include co-processing at least pyrolysis liquid and a distillation residue from tall oil distillation in a catalytic cracking process in a presence of a solid catalyst to provide a cracking product.

19 Claims, 2 Drawing Sheets (51) Int. Cl.
*C10L 1/04* (2006.01)
*C10G 1/00* (2006.01)

(52) U.S. Cl.
CPC ........ *C10L 1/04* (2013.01); *C10G 2300/1011*
(2013.01); *C10G 2300/1014* (2013.01); *C10G 2300/1033* (2013.01); *C10G 2300/1048* (2013.01); *C10G 2300/1074* (2013.01); *C10G 2300/202* (2013.01); *C10G 2300/4006* (2013.01); *C10G 2400/02* (2013.01); *C10L 2200/0438* (2013.01); *C10L 2200/0469* (2013.01); *C10L 2200/0484* (2013.01); *C10L 2270/023* (2013.01); *C10L 2290/543* (2013.01)

(56) References Cited

U.S. PATENT DOCUMENTS

| | | | |
|---|---|---|---|
| 5,961,786 | A | 10/1999 | Freel et al. |
| 9,663,720 | B2 | 5/2017 | Nousiainen et al. |
| 2014/0296592 | A1 | 10/2014 | Zhu et al. |
| 2014/0316176 | A1 | 10/2014 | Fjare et al. |
| 2015/0005548 | A1 | 1/2015 | Freel et al. |
| 2015/0057474 | A1* | 2/2015 | Nousiainen ............ C10G 3/50 585/16 |
| 2015/0238882 | A1* | 8/2015 | Ladkat ............ B01D 3/143 422/187 |
| 2016/0046873 | A1 | 2/2016 | Räsänen et al. |
| 2016/0090539 | A1 | 3/2016 | Frey et al. |
| 2016/0130509 | A1* | 5/2016 | Nousiainen ............ C10G 45/58 585/324 |
| 2016/0168481 | A1 | 6/2016 | Ray et al. |
| 2016/0244677 | A1 | 8/2016 | Froehle |
| 2016/0289576 | A1 | 10/2016 | Eilos |
| 2017/0190991 | A1 | 7/2017 | Sundberg et al. |
| 2020/0181502 | A1* | 6/2020 | Paasikallio ............ C10G 11/02 |

FOREIGN PATENT DOCUMENTS

| | | |
|---|---|---|
| CN | 104073292 A | 10/2014 |
| CN | 105378034 A | 3/2016 |
| FI | 20156043 A | 7/2017 |
| WO | WO-2010068255 A1 * | 6/2010 ............... C10G 3/49 |
| WO | 2012062924 A1 | 5/2012 |
| WO | 2014001633 A1 | 1/2014 |
| WO | 2015055896 A1 | 4/2015 |

OTHER PUBLICATIONS

Office Action dated Aug. 19, 2020, by the Finnish Patent Office in corresponding Finnish Patent Application No. 20176185. (4 pages).
A. Oasmaa et al., "Fast Pyrolysis Bio-Oils from Wood and Agricultural Residues", Energy & Fuels, 2010, American Chemical Society, 2009, pp. 1380-1088.
A. Oasmaa et al., "Fast Pyrolysis of Forestry Residue. 1. Effect of Extractives on Phase Separation of Pyrolysis Liquids", Energy & Fuels, 2010, American Chemical Society, Apr. 10, 2002, (12 pages).
European Search Report issued in corresponding European Patent Application No. EP17178808, 2 pages (dated Nov. 24, 2017).
International Search Report and Written Opinion issued in corresponding International Patent Application No. PCT/FI2018/050501, 11 pages (dated Sep. 13, 2018).
Finnish Office Action dated Jun. 13, 2018, by the Finnish Patent and Registration Office in corresponding Finnish Patent Application No. 20176185. (6 pages).
International Search Report (Form PCT/ISA/210) dated Jul. 30, 2018, by the European Patent Office in corresponding International Application No. PCT/EP2013/067383. (3 pages).
U.S. Appl. No. 16/627,131, "Enhancing Co-Processing of Lignocellulose Pyrolysis Oil by Enhancing Its Compatibility with Typical Oil Refinery Hydrocarbon Feed" by Ville Paasikallio, et al., filed on Dec. 27, 2019.
Office Action dated May 21, 2021, by the Chinese Patent Office in corresponding Chinese Patent Application No. 201880056035.3. (8 pages).
Office Action dated Apr. 14, 2021, by the Canadian Patent Office in corresponding Canadian Patent Application Mo. 3,067,949. (8 pages).
Office Action (The Second Office Action) dated Sep. 13, 2021, by the State Intellectual Property Office of People's Republic of China in corresponding Chinese Patent Application No. 201880056035.3 and an English Translation of the Office Action. (9 pages).
Office Action dated Nov. 2, 2021, by the Canadian Patent Office in corresponding Canadian Patent Application No. 3,067,949. (3 pages).

* cited by examiner

Fig. 2

PROCESS FOR INCREASING GASOLINE AND MIDDLE DISTILLATE SELECTIVITY IN CATALYTIC CRACKING

TECHNICAL FIELD

The present invention relates to a process for increasing gasoline and middle distillate selectivity in catalytic cracking. Specifically, the invention relates to a process for increasing gasoline and middle distillate selectivity in catalytic cracking while at the same time increasing the amount of renewable raw materials employed in catalytic cracking.

TECHNICAL BACKGROUND

Mobility and logistics are an essential part of life, economy and society today. To meet the growing energy needs of traffic and transport it is important to seek sustainable fuel solutions. A fuel can be considered sustainable when the well-to-wheels impact on the ecological and social environment is the lowest possible. Decarbonizing the transport sector is a major challenge and fossil fuels should slowly be replaced by more sustainable fuels. Liquid fuel has benefits compared to gases and electricity in traffic solutions due to existing infrastructure and fuel logistics. The energetic content of liquid fuels is also superior, which is essential since energy needs to be carried on-board in vehicles.

Catalytic cracking (fluidized and thermal) of heavy hydrocarbon streams such as vacuum gas oil (VGO) produces a wide array of products which range from gaseous C1-C2 hydrocarbons to solid carbonaceous coke on the catalyst surface. Within the distillate product range that falls between these two extremes, compounds boiling in the gasoline and middle distillate range are valuable in the preparation of transportation fuels. Distillate products from catalytic cracking exhibit varying degrees of saturation—paraffins, olefins, naphthenes and aromatics are all present in the product mixture. While the relative amount of hydrogen in these products varies, all molecules include a structural backbone consisting of carbon-carbon bonds. Thus, it is clearly beneficial to design and operate the cracking process in a manner which ensures that the carbon that goes into the process is also directed to the most desirable products with a high selectivity.

The prior art has made various attempts to employ renewable raw materials in catalytic cracking to increase the total content of renewable material in fuel products. These attempts focus on co-processing pyrolysis liquid (pyrolysis oil), which is derived by pyrolysis of renewable material (e.g. plant material), with conventional (fossil) streams in a catalytic cracking unit.

For example, US 2016/0168481 A1 discloses fluid catalytic cracking (FCC) of pyrolysis oil stream together with a hydrocarbon stream, such as diesel stream. US 2016/0244677 A1 mentions FCC of a mixture of pyrolysis oil as a first feedstock and a petroleum oil as a second feedstock. FCC of pyrolysis oil together with a petroleum-based HC stream is disclosed in US 2016/0090539 A1. US 2015/0005548 A1 discloses FCC of a renewable fuel oil (pyrolysis oil) and a petroleum fraction feedstock. In WO 2012/062924 A1 co-processing of pyrolysis oil with a hydrocarbon stream in FCC is mentioned.

SUMMARY OF THE INVENTION

Lignocellulosic residues represent large raw material potential for production of renewable fuels. They represent a sustainable, non-food and non-ILUC opportunity for renewable fuels. According to the European Environment Agency, the total bioenergy potential from agriculture, forestry and waste is about 300 MToe in 2030 in EU-27. The potential of waste other than lignocellulosics is about 100 MToe, agricultural products amount to about 142 MToe (47% from total) and about 27-50 MToe are derived from forestry depending on the type of environmental constraints and stimulation measures implemented.

The present inventors considered that more sustainable fuels can be produced by increasing the amount of renewable fuel components in fuels, in particular in transportation fuels. More specifically, sustainable fuels should contain a high amount of non-food and non-ILUC renewable fuel components.

The prior art tries to solve this problem by co-processing pyrolysis liquid (PL; sometimes also referred to as pyrolysis oil) with vacuum gas oil in catalytic cracking processes to produce valuable fuel components (boiling in the gasoline and middle distillate range) containing a certain amount of bio-derived carbon. However, the inventors considered that there is still room for improvement, especially regarding the use of waste materials.

PL as renewable feedstocks contains less carbon than (fossil) VGO. Specifically, the carbon content of PL is usually less than 50 wt-% (wet basis, i.e. including water). Catalytic cracking of pure PL is highly challenging due to its adverse physical properties and reactivity, and thus the prior art employs a co-feed to handle these problems.

However, co-processing of renewable PL in catalytic cracking is challenging as well, because the PL is not well miscible with the common co-feeds, such as VGO. The prior art therefore developed various methods to avoid mixing problems or to increase miscibility using additives (such as surfactants). Using alternative co-feeds (other than VGO) is usually not desirable because the result (product distribution) of the cracking procedure depends on the two feeds and is hardly predictable.

The present inventors surprisingly found that it is possible to blend PL with another biogenic feed derived from tall oil distillation (specifically tall oil pitch, TOP). As a further surprising point, the inventors found that co-processing PL with a distillation residue from tall oil distillation provides even more favourable product distribution than the conventional approach of co-processing PL with VGO. Based on this finding, the inventors completed the present invention.

The present invention is defined in the independent claims. Further beneficial embodiments are set forth in the dependent claims. Specifically, the present invention relates to one or more of the following items:

1. A process comprising co-processing at least pyrolysis liquid (PL) and a distillation residue from tall oil distillation in a catalytic cracking process in the presence of a solid catalyst to provide a cracking product.
2. The process according to item 1, wherein the distillation residue from tall oil distillation is tall oil pitch (TOP).
3. The process according to any of the preceding items, wherein the pyrolysis liquid is derived from a cellulose-containing raw material.
4. The process according to any of the preceding items, wherein the ratio of the pyrolysis liquid to the distillation residue (pyrolysis liquid:distillation residue) is in the range of 2:1 to 1:9 by weight.
5. The process according to item 4, wherein the ratio of the pyrolysis liquid to the distillation residue (pyrolysis liquid:distillation residue) is 1:1 by weight or lower, preferably 2:3 by weight or lower or 1:2 by weight or lower.

6. The process according to item 4 or 5, wherein the ratio of the pyrolysis liquid to the distillation residue (pyrolysis liquid:distillation residue) is 1:7 by weight or higher, preferably 1:5 by weight or higher, 1:4 by weight or higher or 1:3 by weight or higher.

7. The process according to any of the preceding items, wherein the total content of the pyrolysis liquid and the distillation residue is in the range of 1.0 to 100.0 wt.-% based on the whole feedstock.

8. The process according to any of the preceding items, wherein the solid catalyst is a particulate catalyst.

9. The process according to any of the preceding items, wherein the solid catalyst is an acidic catalyst.

10. The process according to any of the preceding items, wherein the solid catalyst is a zeolite-based catalyst.

11. The process according to any of the preceding items, wherein the catalytic cracking process is carried out at a temperature in a range of 400° C. to 600° C.

12. The process according to item 11, wherein the catalytic cracking process is carried out at a temperature of 420° C. or more, preferably 440° C. or more, 450° C. or more, 460° C. or more or 470° C. or more.

13. The process according to item 12, wherein the catalytic cracking process is carried out at a temperature of 570° C. or less, preferably 550° C. or less, 540° C. or less, 530° C. or less, 525 or less, or 520° C. or less.

14. The process according to any of the preceding items, wherein the catalytic cracking process is carried out as a continuous process.

15. The process according to any of the preceding items, wherein the catalytic cracking process is a fluid catalytic cracking (FCC) process.

16. The process according to any of the preceding items, wherein the catalytic cracking process is carried out in a transported bed reactor or in a fluidized bed reactor.

17. The process according to any of the preceding items, wherein the catalyst-to-oil-ratio is 3 or more, preferably 4 or more, or 5 or more and/or preferably 20 or less, 15 or less, or 10 or less.

18. The process according to any of the preceding items, wherein the PL and the distillation residue are introduced into the cracking reactor, in which the catalytic cracking process is carried out, using different feeding lines.

19. The process according to any of the preceding items, wherein the PL and the distillation residue are introduced into the cracking reactor, in which the catalytic cracking process is carried out, using the same feeding line.

20. The process according to item 19, wherein the PL and the distillation residue are mixed in advance in a mixing vessel and then introduced into the cracking reactor.

21. The process according to item 19 or 20, wherein a part of one or both of the PL and the distillation residue is further individually introduced into the cracking reactor using separate feeding lines.

22. The process according to any of the preceding items, wherein a petroleum fraction is further introduced into the cracking reactor, in which the catalytic cracking process is carried out, and co-processed with the PL and the distillation residue from tall oil distillation.

23. The process according to item 22, wherein the petroleum fraction and the PL are introduced into the cracking reactor using different feeding lines.

24. The process according to item 22 or 23, wherein the petroleum fraction and the distillation residue from tall oil distillation are introduced into the cracking reactor using different (separate) feeding lines.

25. The process according to item 22, wherein the petroleum fraction and the PL are introduced into the cracking reactor using the same feeding line.

26. The process according to item 22 or 25, wherein the petroleum fraction and the distillation residue from tall oil distillation are introduced into the cracking reactor using the same feeding line.

27. The process according to item 26, wherein the petroleum fraction and the tall oil distillation residue are mixed in advance in a mixing vessel and then introduced into the cracking reactor.

28. The process according to item 25, wherein the petroleum fraction and the PL are mixed in advance in a mixing vessel and then introduced into the cracking reactor.

29. The process according to any one of items 25 to 28, wherein the PL, the distillation residue and the petroleum fraction are mixed in advance in a mixing vessel and then introduced into the cracking reactor.

30. The process according to any of the preceding items, further comprising the step of fractionating the cracking product to provide at least a gasoline fraction and a middle distillate fraction.

31. The process according to any of the preceding items, wherein the fraction of the cracking product boiling in the temperature range from 36° C. to 360° C. provides a yield index in the range of 40 to 99.

32. The process according to item 31, wherein the yield index is at least 50, preferably at least 55, at least 60, at least 65, at least 70, at least 75, at least 80 or at least 85.

33. The process according to item 31 or 32, wherein the yield index is 98 or less, 97 or less, 96 or less, or 95 or less.

34. A fuel component obtainable by a process of any of the preceding items.

35. The fuel component according to item 34, comprising a fraction of the cracking product.

36. The fuel component according to item 34, comprising a fraction of the cracking product boiling in the gasoline range.

37. The fuel component according to item 36, comprising a fraction of the cracking product boiling in the middle distillate range.

38. A use of a cracking product or of a fraction thereof obtained by the process according to any one of items 1 to 33 for producing a fuel or a fuel component.

39. A method comprising producing a cracking product according to the process of any one of items 1 to 33, optionally fractionating the cracking product to provide a cracking product fraction, and blending the cracking product or the cracking product fraction with another fuel component to provide a fuel.

40. The process according to item 22, wherein the petroleum fraction and the PL are introduced into the cracking reactor using different feeding lines and/or using the same feeding line; and/or wherein the petroleum-based fraction and the distillation residue from tall oil distillation are introduced into the cracking reactor using different feeding lines and/or using the same feeding line.

DETAILED DESCRIPTION OF THE INVENTION

The invention is now explained in detail and with reference to specific embodiments. It is to be noted that any feature of the embodiments may be combined with any feature of another embodiment provided that such a combination does not result in a contradiction.

The present invention relates to a process comprising co-processing at least PL and a distillation residue from tall oil distillation in a catalytic cracking process in the presence of a solid catalyst to provide a cracking product.

In the present invention, PL is preferably a non-hydrotreated pyrolysis product from a renewable source. The PL may contain water. Unprocessed PL usually contains water and the PL employed in the process of the present invention may be unprocessed PL.

The pyrolysis liquid of the present invention is a liquid obtained by pyrolysis of bio-derived material, preferably derived from non-food and non-ILUC material. The pyrolysis liquid is preferably a liquid obtained by pyrolysis, which has essentially not been pre-treated or upgraded by hydrotreatment and/or hydrodeoxygenation. A hydrotreatment and/or hydrodeoxygenation to substantially reduce the oxygen content of the pyrolysis liquid can advantageously be avoided in the processes according to the invention.

The pyrolysis liquid may be a whole pyrolysis liquid (i.e. all of the liquid resulting from pyrolysis, including e.g. water) or a part thereof. Although not necessary, it may be favourable to use (only) specific parts of a pyrolysis liquid.

The bio-derived material which is subjected to pyrolysis to provide the PL of the present invention preferably comprises a cellulosic material, more preferably a lignocellulosic material. Hence, preferably the pyrolysis liquid is a pyrolysis liquid derived from a cellulosic material, more preferably a lignocellulosic material.

Any suitable cellulose-containing material may be used as bio-derived material in the pyrolysis. The cellulosic material may be obtained from a variety of plants and plant materials including agricultural wastes, forestry wastes, sugar processing residues and/or mixtures thereof. Examples of suitable cellulose-containing materials include agricultural wastes such as corn stover, soybean stover, corn cobs, rice straw, rice hulls, oat hulls, corn fibre, cereal straws such as wheat, barley, rye and oat straw; grasses; forestry products such as wood and wood-related materials such as sawdust; waste paper; sugar processing residues such as bagasse and beet pulp; or mixtures thereof. In a more preferred embodiment the pyrolysis liquid is obtained by pyrolysis of wood and/or a wood-related material, such as forestry residue, wood chips and/or saw dust. In another preferred embodiment, the wood and/or wood-related material contains bark and/or needles. Most preferably the pyrolysis liquid is obtained by pyrolysis of wood and/or a wood-related material containing pine wood or forestry residue.

Pyrolysis is the thermal decomposition of a (renewable) material at a pyrolysis temperature of preferably 350° C. or more. The concentration of oxygen is preferably less than the concentration required for complete combustion. More preferably, the pyrolysis is carried out in the essential absence of non-in-situ-generated oxygen (i.e. without intentional addition of oxygen). Some oxygen may be generated in-situ during the pyrolysis process. Preferably, pyrolysis is carried out in an atmosphere containing equal to or less than 5 vol. % oxygen, more preferably equal to or less than 1 vol. % oxygen and most preferably equal to or less than 0.1 vol. % oxygen.

The pyrolysis temperature is preferably 350° C. or more, more preferably 400° C. or more and further preferably 450° C. or more. The pyrolysis temperature may be 800° C. or less, preferably 700° C. or less or 650° C. or less. The pyrolysis pressure is not particularly limited. For practical purposes a pressure (absolute pressure) in the range from 0.1 to 5 bar (0.01 to 0.5 MPa), preferably in the range from 1 to 2 bar (0.1 to 0.2 MPa) can be used. For ease of process conditions and in view of apparatus construction, a pressure around atmospheric pressure is preferred (e.g. 1 bar±0.1 bar).

The pyrolysis liquid may be provided by so-called fast or flash pyrolysis of the renewable material. Such fast or flash pyrolysis preferably comprises rapidly heating the renewable material for a very short time and then rapidly reducing the temperature of the primary products before chemical equilibrium can occur.

In the present invention, the pyrolysis liquid may be provided by pyrolysis of the renewable material comprising the steps of heating the renewable material to a temperature equal to a pyrolysis temperature in the range of 350° C. to 800° C., preferably within 3 seconds or less (preferably 2 seconds or less, 1 second or less or 0.5 seconds or less);

maintaining the renewable heated renewable material within the pyrolysis temperature range for between 0.03 and 2.0 seconds (preferably between 0.03 and 0.60 seconds) to produce one or more pyrolysis products;

cooling the pyrolysis products to below 350° C. within 2 seconds or less, preferably within 1 second or less, or within 0.5 seconds or less;

obtaining the pyrolysis liquid from the pyrolysis products.

Examples of suitable fast or flash pyrolysis processes to provide the pyrolysis liquid are described in A. Oasmaa et al, "Fast pyrolysis of Forestry Residue 1. Effect of extractives on phase separation of pyrolysis liquids", Energy & Fuels, volume 17, number 1, 2003, pages 1-12; and A. Oasmaa et al, Fast pyrolysis bio-oils from wood and agricultural residues, Energy & Fuels, 2010, vol. 24, pages 1380-1388; U.S. Pat. Nos. 4,876,108; 5,961,786; and 5,395,455, which are herein incorporated by reference.

After pyrolysis of the renewable material, the pyrolysis products may contain gas, solids (char), one or more oily phase(s), and an aqueous phase. The oily phase(s), optionally including water, may be employed as the pyrolysis liquid in the present invention. The pyrolysis liquid can be separated from the pyrolysis products by any known method. This includes methods such as filtration, centrifugation, cyclone separation, extraction, membrane separation and/or phase separation.

The pyrolysis liquid usually includes one or more of carbohydrates, olefins, paraffins, oxygenates (such as aldehydes and/or carboxylic acids) and water.

Preferably, the pyrolysis liquid comprises carbon in an amount equal to or more than 25 wt.-%, more preferably equal to or more than 35 wt.-%, and preferably equal to or less than 70 wt.-%, more preferably equal to or less than 60 wt.-% (on a dry basis; i.e. not including the water or after full removal of water).

The pyrolysis liquid further preferably comprises hydrogen in an amount equal to or more than 1 wt.-%, more preferably equal to or more than 5 wt.-%, and preferably equal to or less than 15 wt.-%, more preferably equal to or less than 10 wt.-% (on a dry basis).

The pyrolysis liquid further preferably comprises oxygen in an amount equal to or more than 25 wt.-%, more preferably equal to or more than 35 wt.-%, and preferably equal to or less than 70 wt.-%, more preferably equal to or less than 60 wt.-%. Such oxygen content is preferably defined on a dry basis.

The pyrolysis liquid may also contain nitrogen and/or sulphur. If nitrogen is present, the pyrolysis liquid preferably comprises nitrogen in an amount equal to or more than 0.001 wt.-%, more preferably equal to or more than 0.1 wt.-%, and preferably equal to or less than 1.5 wt.-%, more preferably equal to or less than 0.5 wt.-% (on a dry basis). If sulphur is present, the pyrolysis liquid preferably comprises sulphur in an amount equal to or more than 0.001 wt.-%, more preferably equal to or more than 0.01 wt.-%, and preferably equal to or less than 1 wt.-%, more preferably equal to or less than 0.1 wt.-% (on a dry basis).

The pyrolysis liquid preferably comprises water. The amount of water may be equal to or more than 0.1 wt.-%, equal to or more than 1.0 wt.-%, equal to or more than 5.0 wt.-%. Too much water, however, reduces the usability if the PL so that the amount of water is preferably equal to or less than 55 wt.-%, equal to or less than 45 wt.-%, equal to or less than 35 wt.-%, equal to or less than 30 wt.-%, or equal to or less than 25 wt.-%.

The pyrolysis liquid of the present invention may comprise aldehydes, specifically in an amount equal to or more than 5 wt.-%, equal to or more than 10 wt.-%, equal to or less than 30 wt.-%, or equal to or less than 20 wt.-%. The pyrolysis liquid may further comprise carboxylic acids, specifically in an amount equal to or more than 5 wt.-%, equal to or more than 10 wt.-%, and/or equal to or less than 25 wt.-%, or equal to or less than 15 wt.-%.

The pyrolysis liquid may comprise carbohydrates, specifically in an amount equal to or more than 1 wt.-%, equal to or more than 5 wt.-%, and/or equal to or less than 20 wt.-%, or equal to or less than 10 wt.-%.

The pyrolysis liquid may comprise phenols, specifically in an amount equal to or more than 0.1 wt.-%, equal to or more than 2 wt.-%, and/or equal to or less than 10 wt.-%, or equal to or less than 5 wt.-%.

Preferably, the pyrolysis liquid may comprise furfurals, specifically in an amount equal to or more than 0.1 wt.-%, equal to or more than 1.0 wt.-%, and/or equal to or less than 10.0 wt.-%, or equal to or less than 4.0 wt.-%.

In the present invention, a distillation residue from a tall oil distillation (also referred to as a tall oil distillation residue) is a residue fraction (bottom fraction) obtained after at least one distillation step in tall oil distillation. Specifically, the tall oil distillation residue may be obtained as a residue when distilling tall oil, preferably crude tall oil. It is specifically preferable that the tall oil distillation residue is tall oil pitch.

Typically, the tall oil distillation residue comprises several different components. In the present invention, the tall oil distillation residue preferably contains less than 80 wt.-%, less than 70 wt.-%, less than 60 wt.-%, or less than 50 wt.-% resin acids, fatty acids and esters thereof. Specifically, the distillation residue may comprise 23-38 wt.-% esters of fatty acids, together with different wood alcohols, and 15 wt.-% or less free carboxylic acids (primarily fatty acids and resin acids), and the remainder comprises different neutral materials, such as hydrocarbons (e.g. sterols) and wood alcohols.

The tall oil (crude tall oil) which is subjected to distillation to gain the distillation residue is preferably a lignocellulosic (oily) material obtained as a by-product from cellulosic pulp cooking process. It comprises resin acids, fatty acids, neutrals, mainly sterols, and alcohols, and esters of these alcohols and acids. Tall oil is usually refined by distillation at a low pressure. Primary oil, fatty acids and resin acids are recovered as a surplus of the distillation (heads or side stream), in addition to a distillation residue (which is mainly TOP). TOP in itself comprises alcohol esters of fatty and resin acids, oligomers of fatty and resin acids, phytosterols, high-boiling neutral matters such as spirits, hydrocarbons, etc. Conventionally, the use of TOP was limited, firstly by its high viscosity (about 3000 cP at 50° C.), and secondly, by the fact that TOP is never totally rigid. Consequently, it was considered as a low value waste material and used mainly in flaming torches, outdoor fire pots and similar objects. The present invention, however, found that a tall oil distillation residue (such as TOP) can be favourably used as a co-feed with PL in catalytic cracking and is suited to increase the yield of valuable cracking products.

In the present invention, the cracking product is anything (liquid, solid, volatile) that leaves the reactor, except for the catalyst.

Using the process of the present invention, it is possible to increase the renewable content of the catalytic cracking product to up to 100%. In other words, it is possible to co-process only the distillation residue and the pyrolysis liquid while this procedure surprisingly achieves very high yield of valuable products (i.e. products boiling in the gasoline and middle distillate range and thus being favourable for use in transportation fuels). Another effect of the invention is that PL and the distillation residue are more readily miscible than PL and VGO, thus facilitating the catalytic cracking process. Specifically, TOP has shown excellent effects as it can be mixed with PL more easily than conventional co-feeds (such as VGO).

The distillation residue from tall oil distillation is preferably tall oil pitch. TOP was considered mainly as a waste product (or low value product) so that its use does not reduce the amount of other (valuable) products obtained from (crude) tall oil.

The pyrolysis liquid of the present invention is derived from a renewable material and is preferably derived from a cellulose-containing raw material, specifically from a lignocellulose-based material. The cellulose-based raw material may be a wood and/or wood-related material containing bark and/or needles. Preferably, the cellulose-containing raw material is a wood and/or wood related material containing pine wood or forestry residue. The use of a cellulose-containing raw material is advantageous because of low costs, easy handling and the possibility to achieve 100% non-food, non-ILUC products.

In the process of the present invention, the ratio of the pyrolysis liquid to the distillation residue (pyrolysis liquid: distillation residue) is preferably in the range of 2:1 to 1:9 by weight.

The ratio of the pyrolysis liquid to the distillation residue is defined as parts of PL in relation to parts of distillation residue. In other words a ratio of the pyrolysis liquid to the distillation residue (pyrolysis liquid:distillation residue) 1:9 by weight means a mixture containing 1 wt.-part PL and 9 wt.-parts distillation residue (10 wt.-% of PL and 90 wt.-% of distillation residue provided that the sum of PL and distillation residue is 100 wt.-%, i.e. if the mixture consists of PL and distillation residue).

Employing the pyrolysis liquid and the distillation residue within this range allows achieving good yields of valuable transportation fuel components. The ratio is preferably 1:1 by weight or lower, 2:3 by weight or lower or 1:2 by weight or lower. Further, the ratio is preferably 1:7 by weight or higher, preferably 1:5 by weight or higher, 1:4 by weight or higher or 1:3 by weight or higher. Using these ratios can provide particularly good results.

The total content of the pyrolysis liquid and the distillation residue is preferably in the range of 1.0 to 100.0 wt.-% based on the whole feedstock. The total content is particularly preferably at least 1.5 wt.-%, at least 2.0 wt.-%, at least 3.0 wt.-%, at least 4.0 wt.-%, at least 5.0 wt.-%, at least 6.0 wt.-%, at least 7.0 wt.-%, or at least 7.5 wt.-% based on the whole feedstock. Further, a total content of pyrolysis liquid and the distillation residue may be 90.0 wt.-% or less, 80.0 wt.-% or less, 70.0 wt.-% or less, 60.0 wt.-% or less, 50.0 wt.-% or less, 40.0 wt.-% or less, 30.0 wt.-% or less, 20.0 wt.-% or less, 15.0 wt.-% or less, or 10.0 wt.-% or less based on the whole feedstock.

In this respect, the feedstock used herein includes any liquid feed, which is fed to the reactor, e.g. the PL, the distillation residue, an optional recycle stream (recycled product), but excluding the (solid) catalyst. The remainder of the feedstock (if the total content of pyrolysis liquid and distillation residue is less than 100%) may be any suitable feed, such as a petroleum fraction, preferably a hydrocarbon feed, more preferably VGO or the like. A suitable petroleum fraction feed may be a gas oil (GO) feed, a vacuum gas oil VGO feed, a heavy gas oil (HGO) feed, a middle distillate feed, a heavy-middle distillate feed, a hydrocarbon-based feed, or combinations thereof.

Surprisingly, no conventional component and/or heavily processed (e.g. purified, hydrogenated or otherwise chemically modified) component is necessary to achieve good results.

In the present invention, the solid catalyst is preferably a particulate catalyst. Employing a particulate catalyst allows easy handling and easy recycling of the catalyst. Due to such an easy handling and easy recycling procedure, the catalyst is particularly suitable in a fluid catalytic cracking process.

The particulate catalyst preferably has a particle size below 1 cm (longest diameter), more preferably at most 1 mm, at most 500 µm, at most 200 µm, at most 100 µm, as measured by an optical method. Use of these subranges can provide particularly good results and allow easy handling.

In the process of the present invention, the solid catalyst is preferably an acidic catalyst. Employing an acidic catalyst allows achieving good catalytic efficiency in the catalytic cracking process. The acidic catalyst is preferably a catalyst having acid sites. Such an acidic catalyst can be, for example, an oxide-based material containing Brønsted and/or Lewis acid sites. Employing such an acidic catalyst can provide particularly good catalytic efficiency in the catalytic cracking process.

The catalyst of the invention is more preferably a zeolite-based catalyst. Employing a zeolite-based catalyst in the catalytic cracking process allows to achieve excellent catalytic efficiency in the catalytic cracking process. As a zeolite-based catalyst, any commercially available and/or known zeolite-based catalyst can be used. The zeolite-based catalyst may further comprise a binder, a matrix, a filler, metals, additional reactive sites or the like.

The catalytic cracking process according to the invention is preferably carried out at a temperature in a range of 400° C. to 600° C.

Carrying out the catalytic cracking process within this range allows the provision of a suitable temperature range for catalytic cracking. Using the PL and the tall oil distillation residue as a feed, it was found that low cracking temperatures can be used, thus allowing cracking while avoiding excessive side reactions. The temperature is preferably 420° C. or more, more preferably 440° C. or more, 450° C. or more, 460° C. or more or 470° C. or more. Further, the temperature is preferably 570° C. or less, preferably 550° C. or less, 540° C. or less, 530° C. or less, 525 or less, or 520° C. or less. Use of these ranges can provide particularly good results.

In the process of the present invention, the catalytic cracking process is preferably carried out as a continuous process. Using a continuous process provides the advantage that there is no need to change the reaction conditions. Due to this, an easy handling and very good results can be achieved.

In the process of the present invention, the catalytic cracking process is preferably a fluid catalytic cracking (FCC) process. Use of a FCC process allows easy handling and high throughput which results in an advantageous particularly high yield.

The process of the present invention is preferably carried out in a transported bed reactor or in a fluidized bed reactor.

In the process of the present invention, the catalyst-to-oil-ratio is preferably 3 or more. The catalyst-to-oil-ratio is preferably 4 or more, or 5 or more. The catalyst-to-oil-ratio is preferably 20 or less, 15 or less, or 10 or less. The catalyst-to-oil-ratio is defined as the hourly feed of the catalyst per hourly feed of the feedstock. In a non-continuous process, this is equivalent to the total amount of catalyst divided by the total amount of feedstock. In this respect, the feedstock refers to the total liquid feed, i.e. including the PL, the tall oil distillation residue, optionally recycled product, optionally other liquid side feeds (such as fossil fractions). The feedstock does not include the solid catalyst.

In the process of the present invention, the used catalyst is preferably recycled into the reactor, preferably after regeneration outside the cracking reactor.

Employing the catalyst-to-oil-ratio within the above-mentioned range has shown to give good results.

The PL and the distillation residue may be introduced into the cracking reactor, in which the catalytic cracking process is carried out, using different feeding lines. When adding the PL and the distillation residue using different feed lines, it is easier to achieve good temperature control. In a continuous process, the energy required for cracking is usually provided by heated catalyst. Thus, the temperature is highest near the inlet of the catalyst. In case a feed is easily degraded by excessively high temperatures, injecting this feed at a later position (more remote from the catalyst inlet) can reduce coking.

The PL and the distillation residue may be introduced into the cracking reactor, in which the catalytic cracking process is carried out, using the same feeding line. Such a procedure facilitates feeding. It is also possible to combine these approaches, i.e. feed a mixture of PL and the distillation residue using one single feeding line and in addition feeding one or both of the PL and the distillation residue using additional (separate) feeding line(s).

When PL and distillation residue are fed using the same feeding line, it is possible that the PL and the distillation residue are mixed in advanced in a mixing vessel and then introduced into the cracking reactor. Thus, thorough mixing can be achieved.

A petroleum fraction may further be introduced into the cracking reactor, in which the catalytic cracking process is carried out. In this case, the petroleum fraction is co-processed with the PL and the distillation residue from tall oil distillation. In addition or instead of the petroleum fraction, a further renewable fraction may be introduced into the cracking reactor and co-processed with the pyrolysis liquid, the distillation residue and optionally with the petroleum fraction.

The petroleum fraction (and/or further renewable fraction) and the PL may be introduced into the cracking reactor using different feeding lines and/or using the same feeding line. Similarly, the petroleum fraction (and/or further renewable fraction) and the distillation residue from tall oil distillation are introduced into the cracking reactor using different feeding lines and/or using the same feeding line. An appropriate way of feeding the respective fractions depends on the actual processing conditions and the required temperature control. Further, the petroleum fraction (and/or further renewable fraction) may be mixed with the distillation residue, with the PL, or with the distillation residue and the PL in advance.

The process of the present invention preferably further comprises a step for fractionating the cracking product to provide at least a gasoline fraction and a middle distillate fraction. These fractions are the most valuable for traffic fuels and thus separating these fractions from less valuable fractions is favourable. In addition to a gasoline stream and a middle distillate stream, the fractions derived from the fractionation may comprise a gas stream and a distillation bottom. The fractionation may comprise any suitable distillation means, including distillation at normal pressure or distillation or evaporation under reduced pressure.

The fraction of the cracking product boiling in the temperature range of from 36° C. to 360° C. preferably provides a yield index in the range of 40 to 99%. It was surprisingly found that a high content of diesel and gasoline fuel components in overall product distribution can be achieved by using the cracking procedure of the present invention. Specifically, although the amount of carbon (carbon atom weight per total weight) in PL is usually lower than in a distillation residue from tall oil, it was surprisingly found that by combining PL and the distillation residue from tall oil, a greater relative amount of carbon can be converted to the most valuable fuel fractions.

The yield index is determined by the following expression:

$$\text{Yield index} = \frac{\text{total weight of cracking products boiling in a temperature range of 36° C. to 360° C.}}{\text{total weight of carbon in the feedstock}}$$

In other words, the yield index shows how much of the carbon contained in the fresh feedstock (total liquid feed excluding recycled product) finally ends up as valuable middle distillate and gasoline products (which in this case are exemplified as boiling in a range of from 36° C. to 360° C.). The total weight of carbon contained in the feed may be determined by elemental analysis.

Preferably, the yield index is at least 50%, more preferably at least 55%, at least 60%, at least 65%, at least 70%, at least 75%, at least 80% or at least 85%. Although not particularly limited, the yield index may be 98% or less, 97% or less, 96% or less, or 95% or less.

The present invention further relates to a fuel component obtainable by the process of the present invention. The fuel component may be a transportation fuel component. The fuel component may be used as a fuel as it is or may be blended with other fuel components (renewable and/or petroleum fuel components) to get a fuel.

The process of the present invention results in a specific composition of the cracking product due to the unique combination of PL and distillation residue from tall oil. That is, other than conventional cracking products, the present invention provides a fuel component having a specific chemical composition. In particular, the fuel component of the present invention differs from conventional fuel components in terms of boiling ranges, iso-paraffin/n-paraffin content, aromatics content, olefin content, octane number, density, and/or sulfur content.

The fuel component may be composed of the cracking product as a whole (i.e. the direct cracking product without further processing), the cracking product after an optional purification, or a fraction of the cracking product after distillation, evaporation and/or fractionation. Preferably, the cracking product is at least purified by removal of water. The fuel component preferably comprises a fraction of the cracking product. Most preferably, most of the water is removed and the de-watered cracking product is further subjected to fractionation to yield the fuel component.

The fraction of the cracking product is preferably a fraction boiling in the gasoline range and/or in the middle distillate range, preferably in only one of these ranges.

The present invention further relates to a use of a cracking product or of a fraction thereof obtained by the process of the present invention for producing a fuel or a fuel component. The use may include water removal and/or fractionation and/or other purification.

Further, the invention relates to a method of producing a fuel comprising producing a cracking product as defined above, optionally fractionating the cracking product to provide a cracking product fraction, and blending the cracking product or the cracking product fraction with another fuel component to provide a fuel. The method for producing a fuel may further comprise an optional purification of cracking product or of the fraction thereof.

EXAMPLES

The present invention is further illustrated by way of Examples. However, it is to be noted that the invention is not intended to be limited to the exemplary embodiments presented in the Examples.

Example 1

A commercially available TOP product (obtained as a distillation residue after distilling crude tall oil at reduced pressure) was blended with a commercially available PL (wood-derived fast pyrolysis bio-oil) in a ratio TOP:PL of 70:30 by weight.

The mixture was subjected to catalytic cracking at a temperature of 480° C. under ambient pressure (1 bar absolute) using a particulate zeolite-containing cracking catalyst.

Examples 2 and 3

The thermal catalytic cracking was performed according to Example 1 except that the temperature was set to 510° C. (Example 2) and 550° C. (Example 3), respectively.

Comparative Examples 1 to 3

Figure 1:
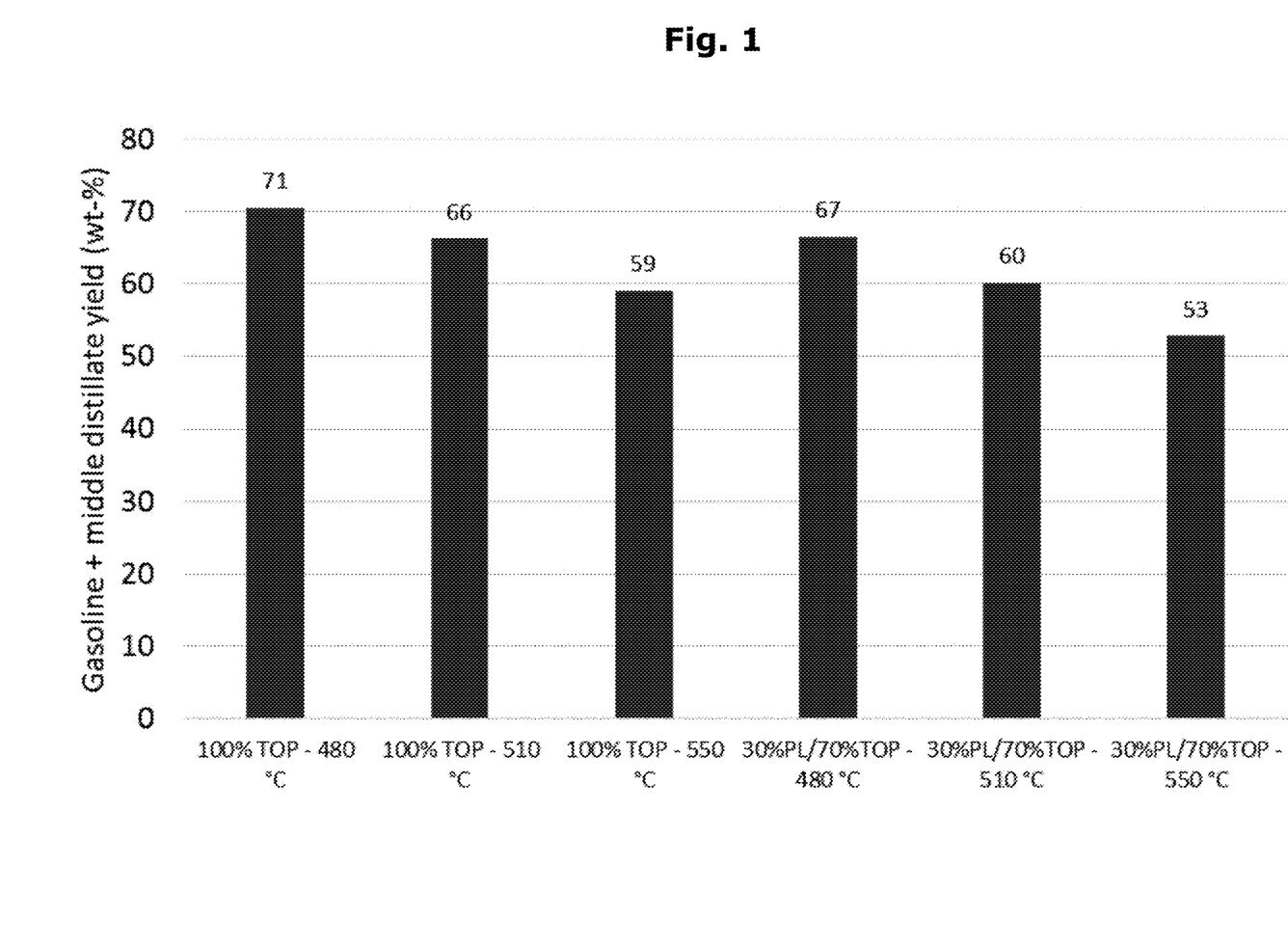
FIG. 1 depicts combined yields (wt.-%) of gasoline and middle distillates from thermal catalytic cracking.

The thermal catalytic cracking in Comparative Examples 1 to 3 was performed in the same manner as in Examples 1 to 3, respectively, except that pure TOP was used instead of a blend of TOP and PL.
Evaluation
Combined Yield of Gasoline and Middle Distillates:

The combined yields (wt.-%) of gasoline and middle distillates from thermal catalytic cracking of Examples 1 to 3 and Comparative Example 1 to 3 were evaluated and the results are shown in FIG. 1. The (absolute) yield of gasoline and middle distillates is defined as the total amount of cracking products boiling in a temperature range of 36° C. to 360° C. divided by the total liquid feedstock subjected to catalytic cracking (i.e. the sum of PL and TOP in the Examples).

The evaluation shows that co-processing of pyrolysis liquid with a distillation residue from tall oil distillation is possible and provides good yields. The absolute yield is higher when processing only TOP. This is due to the fact that TOP has a much higher carbon content and hydrogen content and a much lower oxygen content as compared to PL. Actually, the 70/30 blend of TOP and PL actually contains approximately 10 wt.-% less carbon compared to the pure TOP feed (~70 wt.-% in blend vs. 80 wt.-% for pure TOP).

Figure 2:
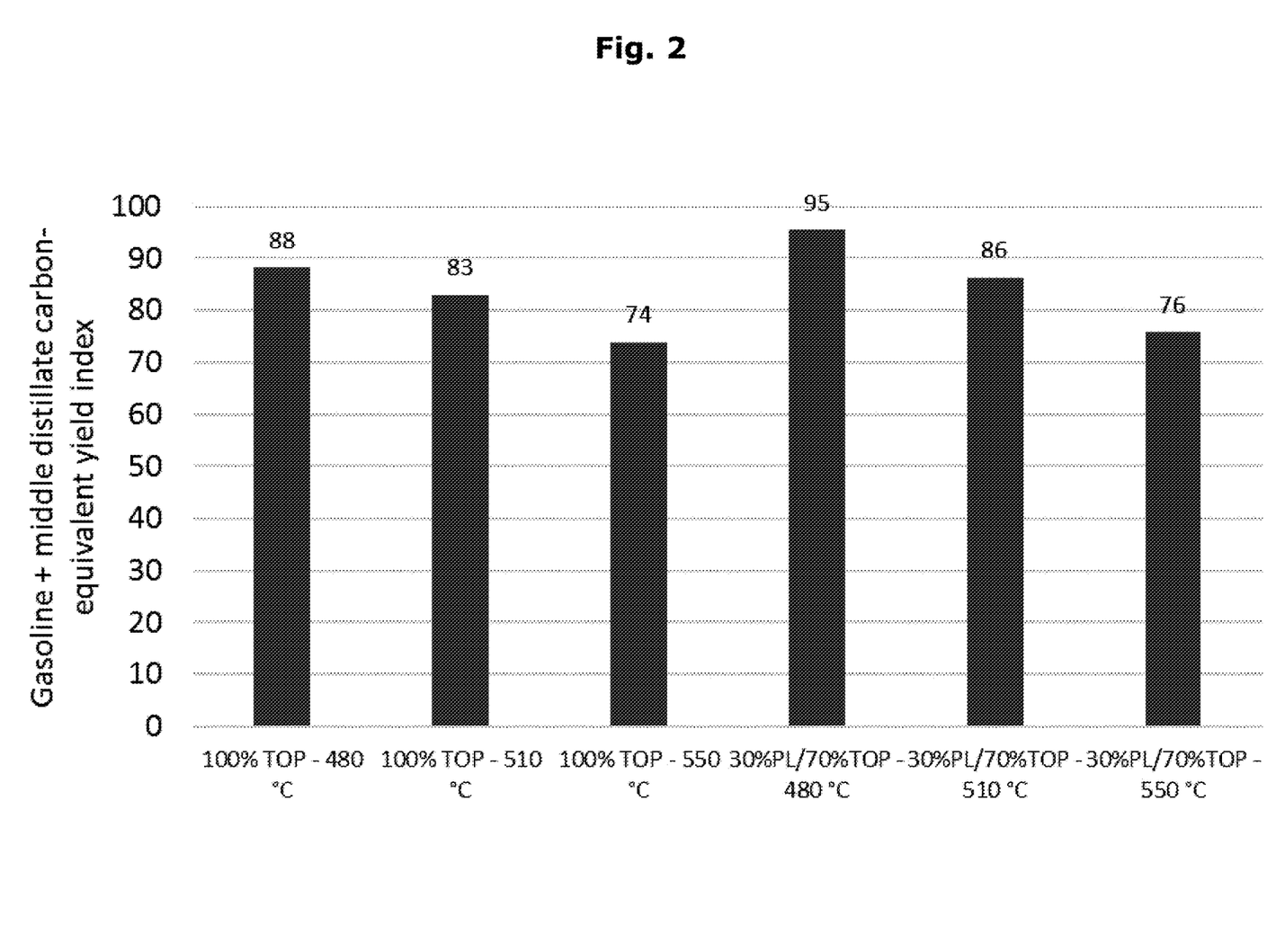
FIG. 2 depicts a yield index for PL/TOP blends.

To show the benefits of the present invention, the yield is therefore shown as the yield index in FIG. 2. FIG. 2 shows that the yield index is surprisingly high for PL/TOP blends in accordance with the present invention.

That is, although the pyrolysis liquid itself is a carbon-deficient feedstock compared to TOP, it surprisingly shifts the overall carbon selectivity towards transportation fuel range products in catalytic cracking. Without wishing to be bound by any particular theory, it is hypothesized that the plurality of oxygen-containing organic functionalities that are present in PL deoxygenate to form reactive hydrocarbon intermediates such as olefins. These reactive intermediates then effectively recombine with TOP-derived molecules within the catalyst pores, which finally results in the synergistic effect that is observed in FIG. 2.

Further, a large part of the oxygen in PL is present in the form of hydroxyl groups, which can be removed via dehydration reactions as $H_2O$. Thus, deoxygenation essentially takes place without the loss of carbon. Therefore, the invention favourably achieves the removal of oxygen in the form of water. Since loss of renewable carbon in the form of carbon oxides is thus minimized, the amount of renewable carbon which is detected by $^{14}C$ isotopic analysis in the fuel product can be increased.

The invention claimed is:

1. A process, comprising:
   co-processing at least pyrolysis liquid (PL) and a distillation residue from tall oil distillation in a catalytic cracking process in a presence of a solid catalyst to provide a cracking product;
   introducing a petroleum fraction into a cracking reactor in which the catalytic cracking process is carried out and carrying out the catalytic cracking process at a temperature in a range of 460° C. to 600° C., as a continuous process with a catalyst-to-oil-ratio of 3 or more.

2. The process according to claim 1, wherein the distillation residue from tall oil distillation is tall oil pitch (TOP).

3. The process according to claim 1, further comprising:
   deriving the pyrolysis liquid from a cellulose-containing raw material.

4. The process according to claim 1, wherein a ratio of the pyrolysis liquid to the distillation residue (pyrolysis liquid: distillation residue) is selected to be in a range of at least one of:
   2:1 to 1:9 by weight, 1:1 by weight or lower, 2:3 by weight or lower, 1:2 by weight or lower; 1:7 by weight or higher, 1:5 by weight or higher, 1:4 by weight or higher, and 1:3 by weight or higher.

5. The process according to claim 1, wherein a total content of the pyrolysis liquid and the distillation residue is in a range of 1.0 to less than 100.0 wt.-% based on a feedstock weight.

6. The process according to claim 1, wherein the solid catalyst is at least one of:
   a particulate catalyst, an acidic catalyst, and a zeolite-based catalyst.

7. The process according to claim 1, further comprising:
   carrying out the catalytic cracking process at a temperature selected to be at least one of:
   470° C. to 600° C., 460° C. to 570° C., 460° C. to 550° C., 460° C. to 540° C., 460° C. to 530° C., 460° C. to 525° C., and 460° C. to 520° C.

8. The process according claim 1, further comprising:
   carrying out the catalytic cracking process as a continuous process, with at least one of:
   a transported bed reactor, a fluidized bed reactor, and a fluid catalytic cracking (FCC) process.

9. The process according to claim 1, wherein the catalyst-to-oil-ratio is selected to be at least one of:
   4 or more, 5 or more, 3 to 20, 3 to 15, and 3 to 10.

10. The process according to claim 1, further comprising:
    introducing the PL and the distillation residue into the cracking reactor via different feeding lines.

11. The process according to claim 1, further comprising:
    introducing the PL and the distillation residue into the cracking reactor via a same feeding line.

12. The process according to claim 11, further comprising:
    mixing the PL and the distillation residue to form a mixture in a mixing vessel; and
    introducing the mixture into the cracking reactor.

13. The process according to claim 11, further comprising:
    individually introducing a part of one or both of the PL and the distillation residue into the cracking reactor using a separate feeding line.

14. The process according to claim 1, further comprising at least one of:
    introducing the petroleum fraction and the PL into the cracking reactor using at least one of different feeding lines, and a same feeding line; and
    introducing the petroleum fraction and the distillation residue from tall oil distillation into the cracking reactor using at least one of different feeding lines and a same feeding line.

15. The process according to claim 1, further comprising:
    fractionating the cracking product to provide at least one of a gasoline fraction and a middle distillate fraction.

16. The process according to claim 1, wherein a fraction of the cracking product boiling in a temperature range of 36° C. to 360° C. is selected to provide a yield index in a range of at least one of:
    40% to 99%, at least 50%, at least 55%, at least 60%, at least 65%, at least 70%, at least 75%, at least 80% and at least 85%.

17. The process according to claim 1, wherein the cracking product or a fraction thereof is utilized as a fuel or a fuel component.

18. The process according to claim 17, wherein the fraction of the cracking product is fraction boiling in a gasoline range and/or a middle distillate range.

19. The process according to claim 1, further comprising:
    producing from the cracking product or a fraction thereof, at least one of:
    a fuel and fuel component.

* * * * *